(12) United States Patent
Hinderling et al.

(10) Patent No.: US 11,428,784 B2
(45) Date of Patent: Aug. 30, 2022

(54) DISTANCE MEASURING APPARATUS WITH HIGH SIGNAL DYNAMICS AND A REFERENCE LIGHT PATH MATCHED THERETO

(71) Applicant: HEXAGON TECHNOLOGY CENTER GMBH, Heerbrugg (CH)

(72) Inventors: Jürg Hinderling, Marbach (CH); Simon Bestler, Langenargen (DE); Reto Stutz, Berneck (CH); Rainer Wohlgenannt, Klaus (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 525 days.

(21) Appl. No.: 16/685,930

(22) Filed: Nov. 15, 2019

(65) Prior Publication Data
US 2020/0158826 A1  May 21, 2020

(30) Foreign Application Priority Data
Nov. 16, 2018 (EP) .................................... 18206703

(51) Int. Cl.
*G01S 7/48* (2006.01)
*G01S 7/481* (2006.01)
*G01S 17/08* (2006.01)

(52) U.S. Cl.
CPC .......... *G01S 7/4808* (2013.01); *G01S 7/4812* (2013.01); *G01S 17/08* (2013.01)

(58) Field of Classification Search
CPC ...... G01S 7/4808; G01S 7/4812; G01S 17/08; G01S 17/89; G01S 17/10; G01S 7/497; G01S 17/42; G01S 7/481
See application file for complete search history.

(56) References Cited

U.S. PATENT DOCUMENTS 4,699,508 A     10/1987  Bölkow et al.
7,064,817 B1 *   6/2006  Schmitt ................. G01S 7/4972
                                                    356/3.01
(Continued)

FOREIGN PATENT DOCUMENTS

DE    102010032724 A1    1/2012
EP        0066888 A2    12/1982
EP        3098626 A1    11/2016

OTHER PUBLICATIONS

Extended European Search Report as received in application No. 18206703 dated May 23, 2019.

*Primary Examiner* — Mohammad K Islam
(74) *Attorney, Agent, or Firm* — Maschoff Brennan

(57) ABSTRACT

A measuring appliance for performing distance measurements to an object, with an optical transmitter channel, an optical reception channel, a reference light path and an evaluation device, wherein the optical transmitter channel comprises a transmitter unit and an optical outlet element and the optical reception channel comprises an optical inlet element and a reception unit. The measuring appliance facilitates distance measurements over a measurement light path to the object and back again and over a reference light path. An attenuation device renders a desired signal attenuation attainable in the reference light path. The reference light path is laid out in such a way that it receives laser measurement radiation prior to the passage through the optical outlet element, guides said laser radiation without contact with the surroundings to the attenuation device and forwards an attenuated portion to the reception unit through the optical inlet element.

14 Claims, 3 Drawing Sheets

(56) References Cited

U.S. PATENT DOCUMENTS

| | | | | |
|---|---|---|---|---|
| 7,511,800 B2* | 3/2009 | Lewis | .................... | G01S 7/497 |
| | | | | 356/5.03 |
| 8,305,561 B2 | 11/2012 | Mori et al. | | |
| 10,185,032 B2* | 1/2019 | Stutz | ....................... | G01S 17/10 |
| 2007/0121095 A1 | 5/2007 | Lewis | | |
| 2013/0201487 A1* | 8/2013 | Ossig | .................... | G01B 11/24 |
| | | | | 356/601 |

* cited by examiner

DISTANCE MEASURING APPARATUS WITH HIGH SIGNAL DYNAMICS AND A REFERENCE LIGHT PATH MATCHED THERETO

CROSS-REFERENCE TO RELATED APPLICATIONS

This application claims priority to European Patent Application No. 18206703.3 filed on Nov. 16, 2018, which is incorporated herein by reference.

FIELD OF THE INVENTION

The invention relates to a measuring appliance, more particularly a tachymeter, theodolite, laser scanner, profiler or laser tracker, with a distance measuring module comprising an optical transmitter channel with a transmitter unit and an optical reception channel with a reception unit. A measurement light path for laser measurement radiation is formed between the transmitter channel and the reception channel, wherein the reception unit renders measurement signals with different signal strengths capturable. Systematic errors in the times-of-flight, which depend on the respective signal strength in particular, are ascertained by capturing laser measurement radiation guided over a reference light path. The ascertained systematic errors are used to improve the measured raw distance values.

BACKGROUND

The strength of the received signal in respect of the laser measurement radiation guided over the measurement light path is set firstly by the distance range to be covered and secondly by the different reflectivities of the surfaces of the objects to be measured. Objects with mirroring or shining surfaces, in particular, produce very different signal amplitudes, depending on the angle of incidence of the optical measurement beam, at the reception unit of the distance measuring module.

There are applications that cover a large distance range to be determined, from less than 1 m to more than several kilometers, wherein strongly diffusely light-scattering target objects with decidedly little backscattering and also prismatic target objects with retroreflection and highest optical quality, and correspondingly high intensity back-radiation, are measured. Here, the signal strengths of the back-reflected and subsequently received signals are very different. The variation typically extends over five orders of magnitude. Previous reception electronics only cover an amplitude range of 10 bits in the process. Signals in the lower dynamic range often remain unused because the signal-to-noise ratio is low there. Then, the employed signal dynamics still covers seven bits, for example.

Distance measuring units have various systematic errors that falsify the measurement result. Some of the error sources depend on the signal amplitude, for example effective transit times in adjustable attenuation units or signal distortions in the reception unit. As a rule, precise distance measuring units comprise a reference signal path or reference light path, over which a reference signal is guided when necessary for the purposes of ascertaining a reference light time-of-flight. Since this reference signal passes over a precisely defined path, it is possible to capture and compensate, or correct, errors in the time-of-flight in the distance measuring module that depend on the signal amplitude, for example.

It is important for compensations or corrections that the received reference signal has no disturbances. Moreover, the signal dynamics of the measurement light path and of the reference light path should be as similar as possible. However, in the solutions known from the prior art, the dynamics of the measurement signal for distance values is often greater than the signal dynamics attainable along the reference light path and, accordingly, systematic signal strength-dependent measurement errors for measurement values in relation to measurement signals outside of the signal dynamics of the reference light path cannot be compensated sufficiently well.

DE 10 2010 032 724 A1 describes a measuring appliance embodied as a laser scanner with a rotating deflection mirror, wherein a reference light path is produced by way of a reflection at the crossbeam of the measuring appliance. Here, the rotating mirror moves the measurement beam both over the region to be measured at a distance from the measuring appliance and over the crossbeam of the support of the measuring appliance carrying the deflection mirror such that, during each revolution of the mirror, it is possible to also ascertain measurement signals relating to the fixed distance from the mirror to the crossbeam in addition to the measurement signals for distance values. In order to be able to capture measurement errors that depend on the signal intensity by way of the reference measurements, the reflection at the crossbeam is carried out with different known brightnesses of a prism.

The compensation values ascertained for different signal intensities by measurements over the reference light path are used for correcting the distance values for the regions at a distance from the measuring appliance in accordance with the respective signal intensity. However, the attenuation attainable by the reflection at prisms at the crossbeam is limited on account of the high reflectivity of prisms, and so it is often not possible to obtain sufficiently large signal dynamics. Accordingly, a compensation of distance measurement errors in the case of small signal intensities is not possible.

Further, in the case of arrangements of the prior art, particularly in the case of a reference light path with a reflective external reference target, for example arranged in the nadir direction at the crossbeam of a laser scanner having a rotating mirror, parasitic stray light may be coupled into the reference path, wherein the stray light may have a different time-of-flight on account of multiple reflections. The time-of-flight of the reference signal is falsified accordingly.

Reference light paths that are led over an external reference target are disadvantageous in that the reflecting or diffusing elements thereof are dirtied. Dirt particles in turn not only reduce the reference signal but also falsify the nominal light time-of-flight by stray light since stray light typically passes along trajectories that are longer than the envisaged reference path. Even if reflecting or diffusing elements are protected by a coverslip, trajectories with deviating light times-of-flight arise.

All reference light paths known from the prior art have a restricted signal amplitude range and, for example, it is not possible to calibrate in situ a reception unit with modern photosensors with an extended dynamic range.

Very recently, improved sensors and reception circuits have been developed, which are able to process an extended amplitude range of received signals. However, such reception electronics are often nonlinear in respect of the incident signal amplitude and, as a result, distort either the form of pulses, or pulse sequences, or the temporal phases thereof.

Such effects lead to systematic distance errors (range walk). EP 3 098 626 describes a reception unit that covers an amplitude range that has been extended by a factor of 200. Moreover, the noise level is very low, which once again extends the employable dynamic range towards small signal intensities.

Reception units with signal-compressing photodiodes are known. By way of example, so-called semiconductor photomultiplier sensors (SPM sensors), also referred to as SiPMs (silicon photomultipliers), with a photosensitivity in the visible and near infrared spectral range are gradually replacing the previously used photomultiplier tubes. The signals produced by such sensors are inherently nonlinear in terms of amplitude, which leads to significant amplitude-dependent distance errors without a range walk correction.

SPM sensors consist of hundreds, thousands or even more than ten thousand microcells and are thus able to receive pulses with thousands, or hundreds of thousands, of photons within picoseconds. Typically, SPM sensors are operated in the overbreak mode (Geiger mode) and behave like analog sensors. When a microcell is addressed, the latter produces a single discrete voltage pulse, with the "analog" behavior arising from a common output of the multiplicity of microcells, which each supply a common discrete "digital" voltage pulse. Such SPM sensors are often also referred to as SPAD arrays.

An SPM sensor with a sufficient number of cells captures the received signal amplitude over a large dynamic range (typically up to 1E8) and, in a certain sense, compresses the input amplitude of very small to very large signals. The SPM sensor is never overloaded thanks to an exponential characteristic; overloading does not occur in the case of very large signals either, for example not even if the radiation is cast back by an angle-precise retroreflector.

At a given photon number, the output signal of the SPM sensor asymptotically approaches a maximum limit voltage, which is adapted to the subsequent amplifier circuit and which guarantees that the subsequent electronics are not overloaded up to the time measuring circuit. As a result, a precise distance measurement is possible over a high dynamic range.

Since these SPM sensors cover a very broad amplitude range of received signals, such reception units require a reference light path with sufficient amplitude dynamics.

Previous reference light paths have been unable to provide disturbance-free, more particularly distance-precise reference received signals over the required dynamic range or the required amplitude ranges of these reception sensors. In particular, signals with small amplitudes, or those with large amplitudes, for example, could previously not be calibrated with the use of such SPM sensors for this reason, too, leading to measurement distance inaccuracies in these signal ranges.

SUMMARY

Now, the object according to some embodiments of the invention consists in providing an improved measuring appliance that, proceeding from received signals over a predetermined dynamic range, renders accurate distance values determinable by virtue of corrections being determined from measurements over a reference light path and said corrections being used to compensate systematic errors in the time-of-flight and distance values ascertained from the time-of-flight.

The general object according to some embodiments the invention is achieved by an apparatus having the features of Claim 1. The dependent claims describe alternative embodiment variants that achieve further objects.

The concept according to some embodiments of the invention relate to an optical reference channel of a measuring appliance being configured to produce a so-called "self-luminous" reference target with an intensity that varies in time and/or space, wherein the measuring appliance is further configured in such a way that the reception channel passes over the self-luminous reference target, in particular in repetitive fashion.

Here, self-luminous relates to the reference radiation propagating in so-called "unidirectional" fashion in a section (outside of the distance measuring module of the measuring appliance) of the reference channel between the reference target and an entrance optical unit of the reception channel, i.e., wherein there is no reversal of the propagation direction of the reference radiation as is the case, for example, in measuring appliances from the prior art, which have a rotating mirror and a reflective reference target arranged at the crossbeam of the measuring appliance.

The use of a so-called self-luminous reference target is advantageous in that this allows the use of attenuation devices for attenuating the reference radiation, which facilitate a radiation attenuation over five or more orders of magnitude, for example transmissive attenuation devices that provide a variable setting from substantially complete transmission to substantially complete radiation extinction. By way of example, it is possible to employ attenuators that are quickly switchable in time, e.g., attenuators based on electro-optic or spatial modulators.

Further, the required signal dynamics can also be provided by way of optical elements for producing a spatially dependent radiance, wherein the visible radiant intensity is strongly angle-dependent such that a high signal dynamic range is passed over by means of the passing movement of the reception channel.

The measuring appliance according to some embodiments of the invention, more particularly the tachymeter, the theodolite, the laser scanner, the profiler or the laser tracker, facilitates distance measurements to objects and comprises a distance measuring module with an optical transmitter channel and an optical reception channel. Moreover, the measuring appliance comprises a reference light path and an evaluation device. The optical transmitter channel comprises a transmitter unit for transmitting laser measurement radiation and an optical outlet element. The optical reception channel comprises an optical inlet element and a reception unit for receiving laser measurement radiation. The measuring appliance renders a measurement light path producible, which extends outside of the distance measuring module to the object and back again between the optical outlet element and the optical inlet element.

The reference light path has a predetermined reference distance, comprises an attenuation device with an attenuation variable in space and/or time and is configured in such a way that it guides laser measurement radiation generated by the transmitter unit to the reception unit via the attenuation device. Here, the reference light path is laid out in such a way that it receives a portion of the laser measurement radiation of the transmitter unit before reaching the optical outlet element, guides this portion to the attenuation device without contact with the surroundings of the distance measuring module and subsequently forwards an attenuated portion through the optical inlet element to the reception unit, wherein the reception unit receives the reference signals to be used to derive corrected distance values.

The evaluation device is configured to derive a distance to the object and, in the process, uses laser measurement radiation returning from the object, received by the reception unit, and laser measurement radiation guided over the reference light path, received by the reception unit. Intensity-dependent systematic errors are at least partly compensated when deriving the distance to the object.

Using the described embodiment of the reference light path, substantially disturbance-free received signals of the reference light path can be obtained for selectable attenuations and correspondingly exact corrections of the distance measurement values. Receiving laser measurement radiation in the reference light path before said laser measurement radiation reaches the surroundings of the distance measuring module through the optical outlet elements ensures that no parasitic radiation arises on the path to the attenuation device.

On the reference light path, the access region of the attenuation device does not face the surroundings of the distance measuring module, but it is disposed in an interior region of the measuring appliance, or of the distance measuring module, or directly connected to a light guide. Hence, this access side is protected against dirtying and no parasitic stray light can be coupled into the reference light path, preventing disturbances from arising.

The amplitude of the reference signal that reaches the reception unit from the transmitter unit via the reference light path for the purposes of ascertaining a reference light time-of-flight is merely attenuated by an attenuation factor assigned to the attenuation device during the passage through the optical attenuation device, without disturbances arising. The reference light path according to the invention provides very weak to strong optical signals, which all have, within picoseconds, precisely the same time-of-flight. The powers preferably comprise a dynamic range of at least five or more orders of magnitude.

Downstream of the attenuation device, an attenuated portion of the laser measurement radiation reaches the reception unit through the optical inlet element along the reference light path, said reception unit receiving the reference signals to be used to derive corrected distance values. The reference light path passes through the same optical inlet element to the same reception unit as the measurement light path. At least directly upstream of the optical inlet element, a section of the reference light path lies outside of the distance measuring module of the measuring appliance. In this section, the laser measurement radiation is embodied as a free beam, both on the measurement light path and on the reference light path, and the passage through the optical inlet element and the reception by the reception unit produces the same systematic errors for both light paths.

Both the measurement light path and the reference light path proceed from the same transmitter unit, but the optical outlet element of the optical transmitter channel only lies in the measurement light path and not in the reference light path. It was found that despite this difference between the measurement light path and the reference light path, the systematic errors arising as a function of the respective amplitude on these two light paths are substantially the same. Therefore, a correction of the measurement distance on the measurement light path on the basis of the reference measurement on the reference light path ensures an exact value for the distance measurement over the measurement light path.

The solution according to the invention ensures that as many of the required optical elements that lead to systematic errors as possible are the same on the measurement light path and on the reference light path.

A section of the reference light path lies outside of the distance measuring module directly upstream of the optical inlet element. According to one embodiment, the reference light path is unidirectional, at least in this section. Unwanted arising stray light, which moves in the opposite direction along the reference light path, cannot lead to a received signal and consequently cannot lead to an incorrect distance value either on a unidirectional section of the reference light path or on a reference light path that is unidirectional overall. The laser measurement radiation only moves in one direction along a unidirectional reference light path and reaches the reception unit through the optical inlet element of the optical reception channel.

Laser measurement radiation produced by the transmitter unit and supplied to the reference light path is guided in the distance measuring module on a section securely arranged at the measuring appliance and reaches a section moving relative to the optical reception channel outside of the distance measuring module.

In one embodiment, the change between measuring the reference distance over the reference light path and a measurement over a measurement light path is obtained by way of an optical deflection element, for example a rotating mirror, wherein the deflection element, in each case depending on phase, connects the reference light path or the measurement light path to the optical inlet element or interrupts said connection.

In the case of a measurement light path, the laser measurement radiation, during a measurement phase, reaches the object from the transmitter unit through the optical outlet element via this deflection element and reaches the reception unit from the object through the optical inlet element via this deflection element. On the reference light path, the laser measurement radiation, during a reference phase, reaches the reception unit from the transmitter unit through the attenuation device and subsequently through the optical inlet element via said deflection element, without ever emerging from the transmitter unit through the optical outlet element. On the reference light path, the laser measurement radiation only strikes the deflection element once.

During the reference phase, the reception unit passes over the laser measurement radiation at the end of the reference light path. If the radiant intensities of the laser measurement radiation of the reference light path visible through the reception channel are strongly dependent on the alignment of the optical deflection element, or of the rotating mirror, then the reference signal in the reference phase passes through the amplitude range required for the range walk calibration when passing over the attenuation unit. During this phase, distances assigned to the signal amplitudes are determined with a measuring rate in the MHz range. By way of example, a correction table is created at the end of a reference phase, said correction table providing the amplitude-related distance offsets.

In another embodiment, the change between the measurement of the reference distance over the reference light path and a measurement over a measurement light path is obtained by a relative movement between a first device part with a section of the reference light path and a second device part with the optical outlet element and the optical inlet element. The section of the reference light path of the first appliance part is assigned to the optical inlet element in such a way that, in the case of a predetermined relative position of the two appliance parts, the reference light path is directed on the optical inlet element in such a way that the laser measurement radiation at the end of the reference light path reaches the optical reception unit through the optical inlet element.

In this predetermined relative position, the measurement light path from the optical outlet element to the optical inlet element, for example, is at least partly interrupted such that laser measurement radiation from the reference light path reaches the reception unit without laser measurement radiation from the measurement light path. If the appliance parts are not in the predetermined relative position, the measurement light path from the optical outlet element to the optical inlet element is open and no laser measurement radiation reaches the reception unit over the reference light path.

By way of example, the second appliance part with the transmitter channel and the optical outlet element and the reception channel and the optical inlet element is arranged so as to be rotatable about an axis of rotation and the appliance part with the reference light path is formed so as to be stationary in relation to elements that are radially outside of the rotatable appliance part. On the axis of rotation, the reference light path comprises an optical rotation feedthrough such that laser measurement radiation proceeding from the transmitter unit can be brought to the rotation feedthrough upstream of the optical outlet element and, from said rotation, to the optical inlet element in a supply position, wherein, respectively in the case of a predetermined relative position of the two appliance parts, the reference light path is directed onto the optical inlet element in such a way that the laser measurement radiation at the end of the reference light path reaches the optical reception unit through the optical inlet element. At least one attenuation device is arranged on the reference light path.

Because the reference light path is laid out in such a way in all embodiments that it receives a portion of the laser measurement radiation of the transmitter unit before the optical outlet element is reached and because it guides this portion without contact with the surroundings of the measuring appliance to the attenuation device, this ensures that the attenuation does not lead to disturbances.

The optical attenuation device is constructed in such a way that the attenuation factor assigned thereto is adjustable.

In individual embodiments, the adjustability is reached, at least in part, by virtue of the reference light path and at least one part of the attenuation device being adjustable relative to one another such that the reference light path leads over regions of the attenuation device with different attenuation factors. The attenuation factor is adjustable in other embodiments.

The attenuation device comprises at least one transmissive and/or at least one reflective attenuation region. Thus, reflecting elements with different reflection factors and/or transmissive elements with different transmission factors can be used. The attenuation ensured by these elements can be obtained by diffuser elements, hologram elements, diffractive optical elements, grating elements, gray filters, gray wedges, diffusing films, graduated plates or diffusing plates. Here, direction-dependent differences in the radiant intensity can also be used to provide a desired attenuation.

By way of example, known attenuation devices from the prior art comprise a mechanically driven gray filter with a gray wedge graduation. In order to set a desired attenuation, the measurement signal amplitude of the reference signal is measured, and the gray filter is moved until the signal amplitude lies in a desired range. MEMS-based, mirror-based or stop-based electronically moved signal attenuators (often referred to as VOAs, variable optical attenuators) are also known.

Further known attenuators are based on, for example, electro-optic attenuators or spatial modulators. In addition to apparatuses that are based on liquid crystals, magneto-optic, semiconductor-based "multi-quantum well" arrangements or deformable mirrors, for example, can be used as attenuators.

Until now, arrangements based on liquid crystal technology (manufacturer: Boulder Nonlinear Systems) and the MEMS-based micromirror technology (components from the telecoms sector) have predominantly found use in commercial measuring instruments.

In comparison with liquid crystals, solid optic crystals are substantially more robust in respect of ambient influences, in particular influences of temperature, and can be used, for example without factual reductions in function, over a large temperature range, for example between −20° C. and 50° C., without their optical properties varying greatly as a result thereof. Moreover, the switching speed in optic crystals is several orders of magnitude faster than in liquid crystals. Using solid-state crystals, it is possible to achieve setting speeds of less than 1000 ns; this is not achievable by liquid crystals.

In particular, reflective attenuation regions of the attenuation device on the reference light path and, in particular, in the access region thereof are not dirtied because the reference light path receives laser measurement radiation prior to the passage through the optical outlet element and said reference light path guides said laser measurement radiation without contact with the surroundings of the measuring appliance to the attenuation device or to the reflective attenuation region. Accordingly, the access region of the attenuation element is not in contact with the surroundings of the measuring appliance and hence not exposed to any dirtying. The laser measurement radiation is only reflected at the surface provided to this end and no parasitic reflected light with a different time-of-flight arises.

In advantageous transmissive attenuation regions of the attenuation device, the access region cannot be dirtied and dirtying possible on the outlet side of the attenuation apparatus only further attenuates the laser measurement radiation of the reference light path; however, it does not produce parasitic stray light with a different time-of-flight. The shift in the dynamic range obtainable by dirtying tends to be small and can be taken into account when laying out the reference light path. There is no disturbance due to possible dirtying.

The amplitude of the reference signal that reaches from the transmitter unit to the reception unit over the reference light path for the purposes of ascertaining a reference light time-of-flight is attenuated by a transmission factor or reflection factor assigned to the attenuation device during the passage through said transmissive and/or reflective optical attenuation device. The optical attenuation device is constructed in such a way that the transmission factor or reflection factor assigned thereto is adjustable. By way of example, the respective factor is adjustable in such a way that the amplitude range obtainable over the reference light path at the reception unit is matched to the amplitude range of the measurement signals for distance values to be ascertained.

Using an electronically adjustable transmissive attenuation device, it is possible to provide a large attenuation range, or large dynamics, and, in particular, a quick adjustment of the attenuation with little outlay. The sweep of the attenuation can be implemented synchronously with the rotational movement of the rotating deflection mirror, for example within less than one millisecond.

Measurements over the reference light path are carried out at time intervals and the attenuation of the attenuation device should be varied in such a way that the amplitudes of the reference signal occurring during the reference measurements, where possible, are distributed over the entire range of the amplitudes occurring during the distance measurement over the measurement light path. Optionally, reference measurements are carried out with amplitudes of the reference signal that are distributed over a predetermined maximum amplitude range. It is also possible to set a required amplitude range on the basis of the amplitudes occurring over the measurement light path during the distance measurements. When compensating measured distance values, use is made of that reference measurement in each case whose amplitude lies closest to the amplitude of the respective distance measurement. Moreover, a reference measurement is used in each case, which lies as close as possible in time to the distance measurement to be corrected.

So that reference measurements are not impaired by laser measurement radiation for measurements over the measurement light path, the emergence of the laser measurement radiation on the measurement light path is interrupted in a further embodiment during the reference measurements. To this end, the measuring appliance comprises, e.g., controllable beam interrupters, optionally mechanical shutters or LCD shutters, which, in the closed state, prevent the laser measurement radiation from emerging onto the measurement light path.

The measuring appliances measure a distance by means of the time difference between the transmission of a light pulse signal and the reception of the light pulse signal after passing over the measurement light path or the reference light path. The information relating to the transmission time and relating to the form of the light pulse signal can be supplied to the evaluation device via an internal comparison path and said information, together with the received light pulse signal, allows the determination of a time-of-flight. The information relating to the transmission time may also be provided via a trigger signal that triggers the transmission of the light pulse signal. The distance is then determined from the time difference between the trigger signal and the reception of the light pulse after passing over the measurement light path or the reference light path. A correction that corrects the systematic error depending on the amplitude can be determined from the distance measurement over the reference light path and the known length of the measurement light path.

The measuring appliance according to some aspects of the invention is described in more detail below, purely in exemplary fashion, on the basis of exemplary embodiments schematically illustrated in the drawings. In the figures, the same and similar elements are denoted by the same reference signs. As a rule, the described embodiments are not illustrated true to scale and should not be construed as restrictions either.

BRIEF DESCRIPTION OF THE DRAWINGS

In detail.

DETAILED DESCRIPTION

Figure 1:
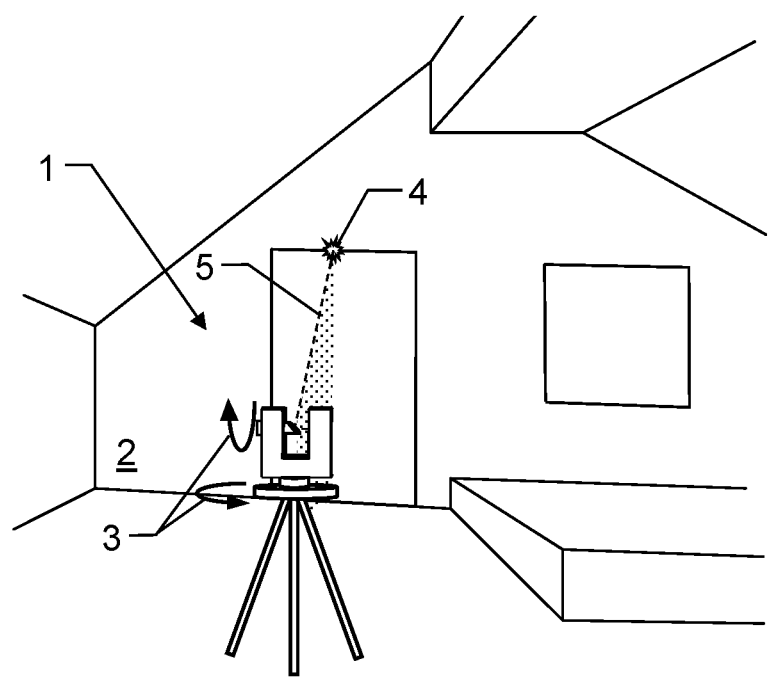
FIG. 1: shows a perspective illustration of a 3D laser scanner when used inside.

FIG. 1 shows a measuring appliance 1 in the form of a 3D laser scanner when used inside 2. The illustrated laser scanner can align the laser measurement beam in any desired measurement direction by rotating parts of the laser scanner about two axes of rotation. The rotations about these axes of rotation are visualized by the arrows 3. The point of a doorframe marked by a circle 4 reflects the laser measurement beam on the measurement light path 5 with a high intensity and indicates that the intensity of the received signal may have very large variations.

As a rule, surfaces of walls and ceilings are diffusely scattering and produce rather weak to mid received signal amplitudes in the reception unit of a laser scanner. Mirroring objects such as windows and pipes produce back-reflections that comprise an amplitude range of several orders of magnitude. In order to produce point clouds with a high quality of object surfaces, there is a need for measuring appliances with distance measuring modules that supply distance measurements with millimeter accuracy in the case of all occurring signal amplitudes where possible.

Figure 2:
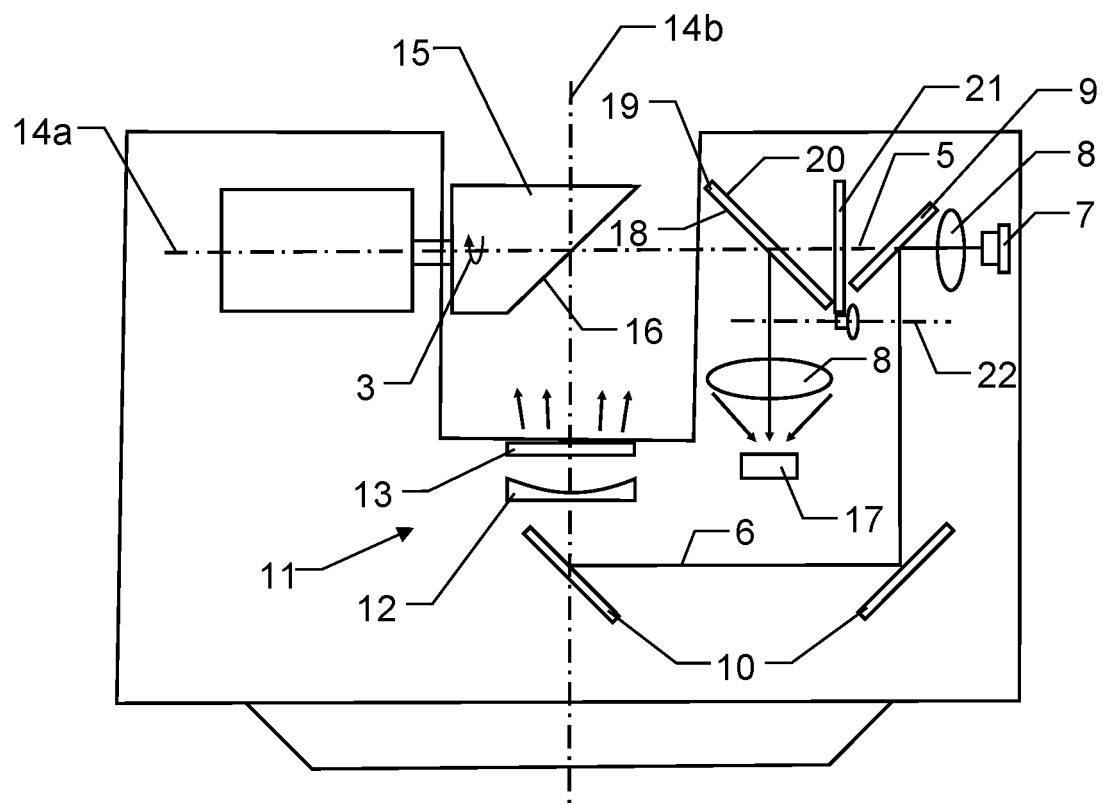
FIG. 2: shows a section through a laser scanner with a unidirectional reference light path guided in the interior of the laser scanner as a free beam.

On the basis of a measuring appliance 1 in the form of a laser scanner, FIG. 2 schematically shows an example for guiding the laser measurement radiation on the measurement light path 5 and on the reference light path 6. The laser scanner comprises an optical transmitter channel with a transmitter unit 7 for transmitting laser measurement radiation. In the illustrated embodiment, the laser measurement radiation in the interior of the laser scanner reaches a beam splitter 9 through a collimated objective lens 8. The beam splitter 9 forwards a portion (<10%) of the laser measurement radiation in the interior of the laser scanner along the reference light path 6: via mirror 10, laser measurement radiation on the reference light path 6 in the interior of the laser scanner reaches an attenuation device 11 arranged in the interior of the laser scanner.

In the illustrated embodiment, the attenuation device 11 comprises a spatial beam expander in the form of a negative lens 12 and a light mixing and beam forming unit in the form of a diffuser 13. After the laser measurement radiation has passed through the diffuser 13, the laser measurement radiation emerges from the interior of the laser scanner and, in the case of suitable rotational alignment of a mirror element 15 that rotates about a first axis 14a, strikes the mirror face 16, inclined by 45° with respect to the first axis 14a, of said mirror. From the mirror face 16, the laser measurement radiation is guided toward an optical reception channel with a reception unit 17 for receiving laser measurement radiation. Upon entry into the interior of the laser scanner, the laser measurement radiation coming from the mirror face 16 reaches an optical inlet element 18 in the form of a reflecting surface of a splitter element 19, for example in the form of a dielectric beam splitter, and reaches the reception unit 17 from said partly reflecting surface through a collimated objective lens 8.

The measuring appliance 1 renders a measurement light path 5 producible, which extends between an optical outlet element 20 and the optical inlet element 18 to the object and back again outside of the measuring appliance 1, or the distance measuring module thereof. In the illustrated embodiment, the optical outlet element 20 is a surface of the splitter element 19 that is laser light-transmissive from the direction of the transmitter unit 7. Consequently, the splitter element 19 directs laser measurement radiation coming from the direction of the mirror face 16 toward the reception unit 17 and allows laser measurement radiation on the measurement light path 5 toward the mirror face 16 to emerge from the interior of the measuring appliance 1. The splitter element 19 can be laid out as a zonally structured dielectric beam splitter, wherein the latter has an optical transmission to reflection ratio of T:R=0.8:0.2 in the center of a circular area and a ratio of T:R=1.0:0.0 outside of this circle up to the edge.

When rotating the mirror face 16 about the first axis 14a, distance values are rendered capturable in a plane over a large angular range. As a result of the option of rotating the laser scanner about a second axis 14b that is perpendicular to the first axis 14a, it is possible to capture distance values in planes that are rotated with respect to one another about the second axis 14b.

The reference light path 6 is configured in such a way that it guides laser measurement radiation produced by the transmitter unit 7 to the reception unit 17 via the attenuation device 11. Here, the reference light path 6 is laid out in such a way that it receives a portion of the laser measurement radiation of the transmitter unit 7 before the optical outlet element 20 is reached, it guides this portion without contact with the surroundings of the measuring appliance 1 to the attenuation device 11 and it subsequently forwards an attenuated portion through the optical inlet element 18 to the reception unit 17, wherein the reception unit 17 receives the reference signals to be used for deriving corrected distance values. All possible beam paths, independently of the degree of attenuation within the reference light path 6, have the same path length in this case. This ensures that the respectively captured distances are identical in each case.

During time phases in which laser measurement radiation reaches the reception unit 17 from the mirror face 16 via the optical inlet element 18 over the reference light path, laser measurement light that is guided toward the attenuation device 11 through the optical outlet element 20 and via the mirror surface 16 would be reflected, at least with a small intensity component, at the diffuser 13 or a termination of the laser scanner at the attenuation device 11, where applicable, and would be supplied to the reception unit 17 via the mirror face 16 and the optical inlet element 18. Thus, the reference measurement could be impaired by unwanted light portions.

In order to avoid this, a specific embodiment comprises, e.g., an interrupting element 21, which interrupts the measurement light path during reference measurements in such a way that no laser measurement radiation reaches the mirror face 16 through the optical outlet element 20. By way of example, the interrupting element 21 can be formed as a covering panel or as a chopper wheel which is arranged in rotatable fashion about a third axis 22 and which is driven in synchronized fashion with the mirror element 15 in such a way that it covers or interrupts the measurement light path 5 when the mirror face 16 forms the reference light path from the attenuation device 11 to the optical inlet element 18. It is self-evident that an element with an adjustable transmission factor is also usable instead of a rotating chopper wheel. During distance measurements, the interrupting element 21 enables the measurement light path 5 or the interruption is lifted.

Instead of an interrupting element 21, the outlet opening of the reference path at the diffuser 13 can have an off-centered arrangement in relation to the axial external transmitted beam 5. This ensures that the external transmitted beam 5 does not mirror any disturbing light portions into the reference path in any position of the rotating mirror 16.

An evaluation device, not illustrated, is configured to derive a distance to an object and, in the process, uses laser measurement radiation returning from the object, received by the reception unit 17, and laser measurement radiation guided over the reference light path, received by the reception unit, and the reference distance. Intensity-dependent systematic errors are at least partly compensated in real time when deriving the distance to the object.

So that the reference light path 6 facilitates exact corrections of the distance measurement values, the attenuation device 11 is embodied in such a way that reference measurements are performable with different attenuations. In the embodiment illustrated in FIG. 2, the strength of the diffusion, or a diffusion factor, has an adjustable embodiment in the case of the optical diffuser 13 when necessary. It is also possible for the diffuser 13 to comprise regions with differently pronounced scattering effects perpendicular to the plane of the illustration in FIG. 2 such that reference measurements with different attenuations are performed over a predetermined rotational range of the mirror element 15.

Preferably, use is made of diffusers that produce the light scattering at only one of the two surfaces of a diffusing screen (surface diffusing screen) and not in the interior of a glass matrix (volume diffusing screen). Moreover, the diffusing screen should be laid out in such a way that the chromatic characteristic of the incident radiation remains unchanged.

On the reference light path 6, the access region of the attenuation device 11 does not face the surroundings of the measuring appliance 1; instead, it is arranged in an interior of the measuring appliance 1. Therefore, this access side is protected against dirtying and no parasitic stray light can be coupled into the reference light path, preventing disturbances from arising. The amplitude of the reference signal, which reaches the reception unit 17 from the transmitter unit 7 over the reference light path 6 for the purposes of ascertaining a reference light time-of-flight, is attenuated merely by an attenuation factor assigned to the attenuation device 11 during the passage through the optical attenuation device 11, without disturbances arising. Moreover, the reference light time-of-flight remains unchanged for all beam components on the reference light path.

An attenuated component of the laser measurement radiation reaches the reception unit 17 through the optical inlet element 18 following the attenuation device on the reference light path 6, said reception unit receiving the reference signals to be used to derive corrected distance values. The reference light path 6 leads through the same optical inlet element 18 to the same reception unit 17 as the measurement light path 5. At least directly upstream of the optical inlet element 18, a section of the reference light path 6 lies outside of the distance measuring module of the measuring appliance 1. In this section, the laser measurement radiation is embodied as a free beam, both on the measurement light path 5 and on the reference light path 6, and the passage through the optical inlet element 18 and the reception by the reception unit 17 produces the same systematic errors for both light paths 5, 6.

Both the measurement light path 5 and the reference light path 6 emanate from the same transmitter unit 7; however, the optical outlet element 20 of the optical transmitter channel only lies in the measurement light path 5 and not in the reference light path 6. It was found that despite this difference between the measurement light path 5 and the reference light path 6 the systematic errors that arise on these two light paths depending on the respective amplitude are substantially the same. Therefore, a correction of the measurement distance on the measurement light path 5 on the basis of the reference measurement on the reference light path 6 ensures an exact value for the distance measurement over the measurement light path 5.

The illustrated solution ensures that as many of the necessary optical elements and, more particularly, electronic elements, which lead to systematic errors, are the same on the measurement light path 5 and on the reference light path 6.

In the illustrated embodiment, the reference light path 6 is unidirectional. On a unidirectional reference light path 6, unwanted arising stray light that propagates in the opposite direction along the reference light path 6 cannot lead to a reception signal and consequently cannot lead to an incorrect distance value either. The unidirectional reference light path 6 is laid out in such a way that it is only possible to receive laser radiation that propagates in the forward direction. Here, the laser measurement radiation reaches through the optical inlet element 18 of the optical reception channel to the reception unit 17 from the attenuation device in unidirectional fashion.

In the embodiment illustrated in FIG. 2, the change between the measurement of the reference distance over a reference light path 6 and a measurement over the measurement light path 5 is obtained by way of a rotating mirror face 16, wherein the mirror face 16, depending on the phase, connects the reference light path 6 or the measurement light path 5 to the optical inlet element 18. The angle range of the calibration phase is oriented in the nadir direction and typically comprises 30 degrees of the rotational range of the first axis 14*a*.

Figure 3:
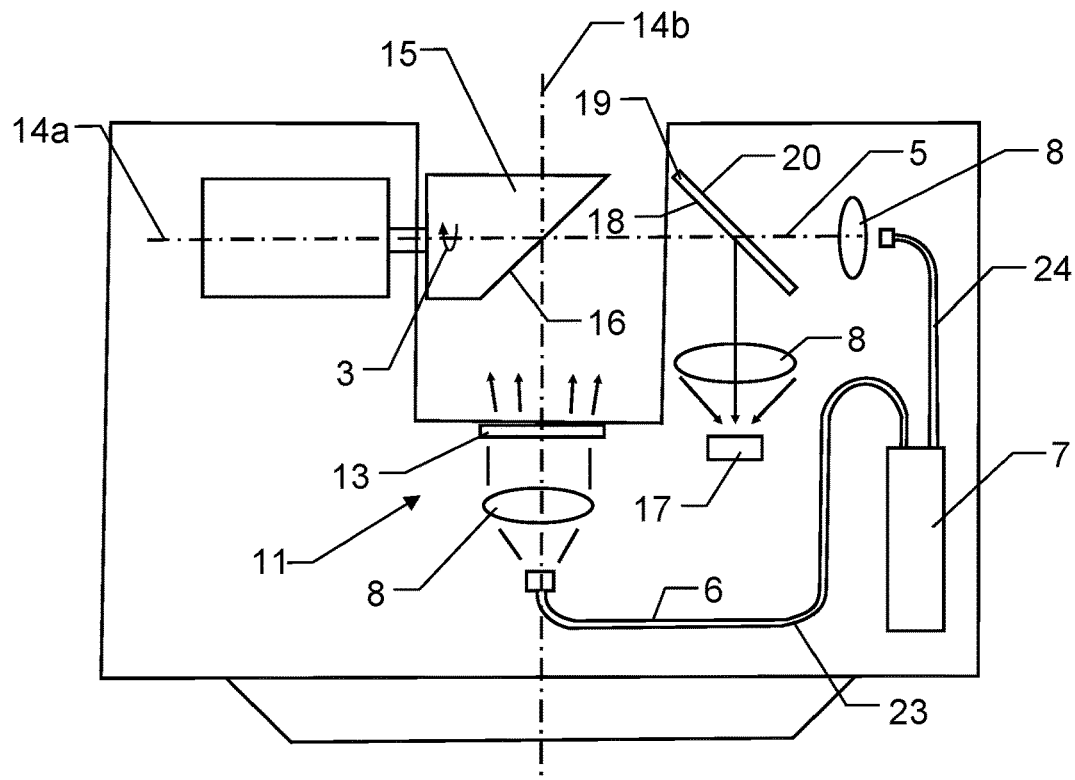
FIG. 3: shows a section through a laser scanner with a reference light path initially guided in a light guide.

FIG. 3 shows a similar embodiment to FIG. 2, wherein sections of the reference light path 6 and of the measurement light path 5 are no longer embodied as free beams but using light guides. The aforementioned description applies to the elements already described on the basis of FIG. 2. Only the altered parts are described on the basis of FIG. 3. The transmitter unit 7 feeds a first light guide 23 and a second light guide 24. The first light guide 23 forms a section of the reference light path 6 and the second light guide 24 forms a section of the measurement light path 5. At the ends of the light guides 23, 24 facing away from the transmitter unit 7, a collimated objective lens 8 is arranged in each case at the transition to the free beam. In order to keep spatial and temporal time-of-flight errors at a minimum, optical single mode light guides are preferably used on the transmitter side. Moreover, these have the advantage of, from a wave theory point of view, producing the smallest possible measurement light spots at the objects to be measured.

In a further embodiment, the transmitter unit 7 comprises an electronically controllable demultiplexer or fiber-optic beam splitter, which only feeds the first light guide 23 with laser measurement radiation in the case of measurements over the reference light path 6, i.e., in the case of positions of the mirror face 16 that lead laser measurement radiation to the reception unit 17 on the reference path 6. If the second light guide 24 is not supplied with laser measurement radiation during the reference measurements, disturbances such as optical crosstalk can be avoided.

Figure 4:
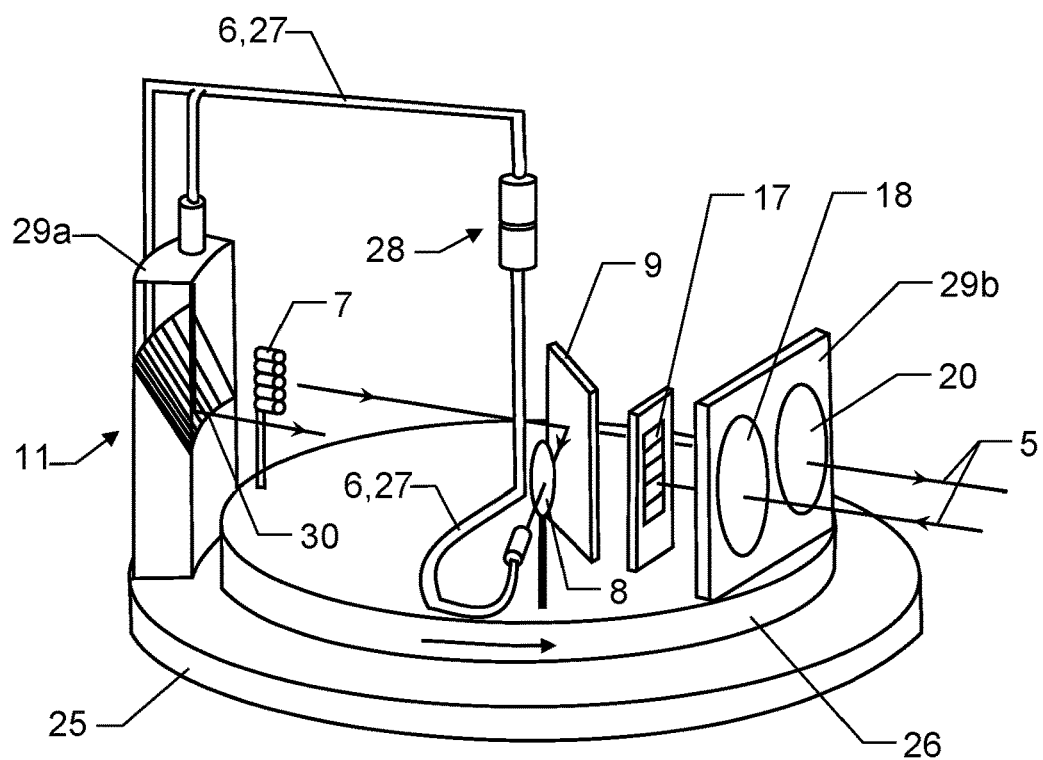
FIG. 4: shows a perspective illustration of selected elements of a profiler.

FIG. 4 shows a measuring appliance 1 in the form of a multi-beam laser profiler comprising a first appliance part 25, which comprises a section of the reference light path 6, and comprising a second appliance part 26, which comprises the optical outlet element 20 and the optical inlet element 18. The second appliance part 26 is rotatable relative to the first appliance part 25 about a central axis of rotation and has a second housing 29*b*, only illustrated in part at the optical outlet element 20 and at the optical inlet element 18, of the second appliance part 26. During each rotation, a section of the reference light path 6 directed from the first appliance part 25 to the second appliance part 26 strikes the optical inlet element 18 and then facilitates a measurement over the reference light path 6. Measurements to external surfaces can be performed over the measurement light path 5 in all other rotational alignments.

The profiler comprises an optical transmitter channel with a transmitter unit 7 for transmitting laser measurement radiation. In the illustrated embodiment, the transmitter unit 7 is configured to produce a multiplicity of transmitter channels for emitting modulated, more particularly pulsed, distance measurement beams. The transmitter channels render different elevations scannable, with the elevations being related to the central axis of rotation. In order to be able to receive the laser measurement beams emitted by the transmitter channels by way of appropriate reception channels, the reception unit 17 is embodied as a multi-channel receiver, for example as a photodiode array, APD array or array of SPAD arrays.

The laser measurement radiation of at least one transmitter channel reaches, via a beam splitter 9 and a lens 8 in the interior of the housing of the second appliance part 26, a connecting light guide 27, which, as part of the reference light path 6, guides the received laser measurement radiation from the rotatable second appliance part 26 to the first appliance part 25 over an optical rotary coupling 28. By way of example, the beam splitter 9 is embodied and arranged in such a way that it deflects the laser measurement radiation of a transmitter channel to the connecting light guide 27. However, the beam splitter 9 may also have a dielectric or metallic coating and in each case deflect 1% of the transmitted light from all transmitter channels to the lens 8. Additionally, a diffractive light mixing element may still be placed upstream of the lens 8 such that each transmitter unit, in the statistical mean, contributes the same to the reference signal path. In this case, the connecting light guide 27 is a multimode light guide, preferably a gradient index fiber. At the end of the connecting light guide 27, laser measurement radiation reaches an attenuation device 11 in the interior of a first housing 29*a* of the first appliance part 25.

In the illustrated embodiment, the attenuation device 11 comprises an attenuation mirror 30 with different reflectances, which are arranged in segment form, for example. The regions can be distributed as providing mirroring, diffuse scattering in white and matt scattering in black. The attenuation mirror 30 guides laser measurement radiation from the regions with different reflectances toward the second appliance part 26. If the optical inlet element 18 is assigned to the laser measurement radiation, forwarded by the attenuation mirror 30, from the regions with different reflectances, the reference measurements can be performed with the corresponding different intensities of the laser measurement radiation.

The measuring appliance 1 of FIG. 4 renders one measurement light path 5, or one measurement light path per transmitter channel, producible, said measurement light path extending from the transmitter unit 7 through the beam splitter 9 to the outlet element 20 and, outside of the distance measuring module of the measuring appliance 1, to the object to be scanned and back again between the optical outlet element 20 and the optical inlet element 18. The optical outlet element 20 has a biaxial offset with respect to the inlet element 18 in the circumferential direction of the second appliance part 26 in the illustrated embodiment. This is advantageous in that the crosstalk between simultaneously activated transmitter channels is minimal in the case of the multi-beam laser profiler. Moreover, the biaxial property between outlet element 20 and inlet element 18 can be used to interrupt the external light channels 5 during the temporal phase when the reception unit receives light over the reference light path. If the second appliance part 26 is in this angular range, the attenuation unit 11 interrupts the radiation reflected back to the inlet element 18 by an external target object. As a result, laser measurement radiation is guided exclusively and without disturbances over the reference light path 6 to the reception unit 17.

The reference light path 6 is configured in such a way that it receives a portion of the laser measurement radiation of the transmitter unit 7 before the optical outlet element 20 is reached, guides said component without contact with the surroundings of the measuring appliance 1 to the attenuation device 11 and subsequently forwards an attenuated portion through the optical inlet element 18 to the reception unit 17, wherein the reception unit 17 receives the reference signals to be used to derive corrected distance values.

When the second appliance part 26 is aligned in such a way that reference measurements are performable, the first housing 29a of the first appliance part 25, or the attenuation device 11 arranged therein, interrupts the measurement light path 5 of at least one transmitter channel such that, at least for this transmitter channel, no distance measurements are possible in the corresponding direction. The range-walk table is updated by means of the reference measurements and the amplitude-referenced systematic errors (distance offsets) derived therefrom. The entries of this range-walk table are used to correct the ascertained raw distance values from the time-of-flight measurements to the target objects.

An evaluation device, not illustrated, is configured to derive a distance to an object and, in the process, uses laser measurement radiation returning from the object, received by the reception unit 17, and laser measurement radiation guided over the reference light path 6, received by the reception unit 17, and the reference distance.

Intensity-dependent systematic errors are at least partly compensated when deriving the distance to the object.

The reference light path 6 is unidirectional in the embodiment illustrated in FIG. 4. On the reference light path 6, the access to the attenuation device 11 from the transmitter unit 7 does not face the surroundings of the measuring appliance 1 but is arranged in interiors of the first and the second housing 29a, 29b. Therefore, this access is protected against dirtying and no parasitic stray light can be coupled into the reference light path, preventing disturbances from arising.

An attenuated component of the laser measurement radiation reaches the reception unit 17 through the optical inlet element 18 following the attenuation device 11 on the reference light path 6, said reception unit receiving the reference signals to be used to derive corrected distance values. The reference light path 6 leads through the same optical inlet element 18 to the same reception unit 17 as the measurement light path 5. At least directly upstream of the optical inlet element 18, a section of the reference light path 6 lies outside of the second housing 29b. In this section, the laser measurement radiation is embodied as a free beam, both on the measurement light path 5 and on the reference light path 6, and the passage through the optical inlet element 18 and the reception by the reception unit 17 produces the same systematic errors for both light paths 5, 6.

Both the measurement light path 5 and the reference light path 6 emanate from the same transmitter unit 7; however, the optical outlet element 20 of the optical transmitter channel only lies in the measurement light path 5 and not in the reference light path 6. It was found that despite this difference between the measurement light path 5 and the reference light path 6 the systematic errors that arise on these two light paths depending on the respective amplitude are substantially the same. Therefore, a correction of the measurement distance on the measurement light path 5 on the basis of the reference measurement on the reference light path 6 ensures an exact value for the distance measurement over the measurement light path 5.

Figure 5:
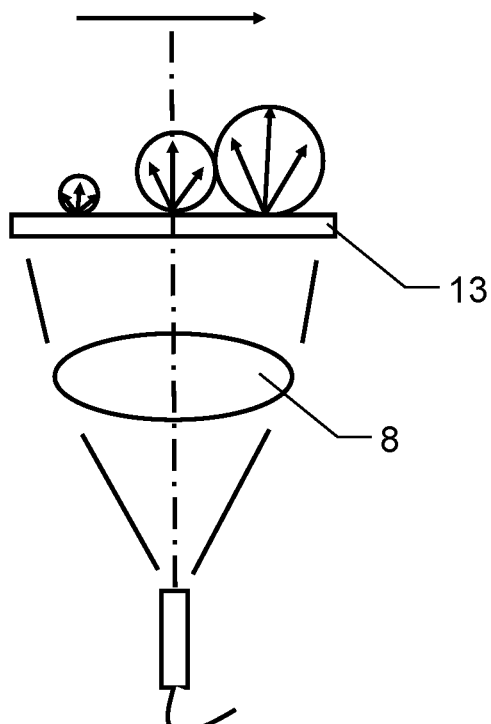
FIG. 5: shows a schematic illustration of a section of a reference light path with a transmissive attenuation element.

FIG. 5 shows an attenuation device 11 in which laser measurement radiation through a collimated optical unit 8 and a diffuser with a diffusion strength that changes in a direction of extent of the diffuser. Accordingly, the radiance or intensity of the laser measurement radiation downstream of the diffuser increases in a direction illustrated by the arrow. If the rotating reception channel sweeps over the attenuation device 11, more particularly the diffuser with the locally decreasing radiance, during the reference phase then a series of distance measurements is captured with changing signal strengths over a large dynamic range. The distances ascertained in the process only capture the intensity-dependent distance error since the reference path light is free from parasitic stray radiation. In a manner comparable to the apparatuses in FIGS. 2 and 3, the radiant intensities of the reference light beam visible through the reception channel are angle-dependent; thus, reception pulses with different signal amplitudes from very weak to an overload are measured during a rotation of the second appliance part 26.

Figure 6:
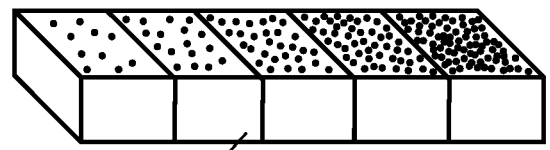
FIGS. 6 and 7: show perspective illustrations of transmissive attenuation elements in the form of a diffuser.
Figure 7:
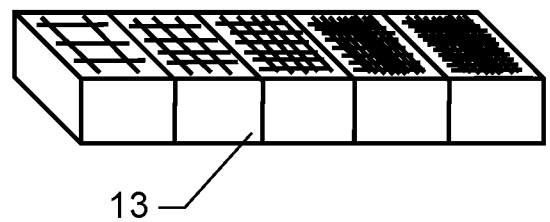

FIGS. 6 and 7 show diffusers 13 in the form of segmented diffuser plates that can be used as transmissive attenuation elements. The differently fine or coarse structures of the segments of the diffuser plates, illustrated in FIG. 6, cause different scattering angles or diffraction angles when laser radiation passes therethrough. Here, care is taken that the light scattering only occurs at a single surface of the diffuser plates.

Known diffuser plates are known as diffractive optical elements (DOEs) or as ground glass screens with a spatially dependent roughness. The spatially dependent scattering can be realized in segments or as a continuous graduation. FIG. 7 shows a diffuser 13 in the form of a beam expander plate with different grating structures that lead to different spatially dependent transmission factors by diffraction and/or light blocking. Here, too, the grating structures are only arranged on one surface. Additionally, absorbing filter layers with an exponential absorption graduation are also possible.

Figure 8:
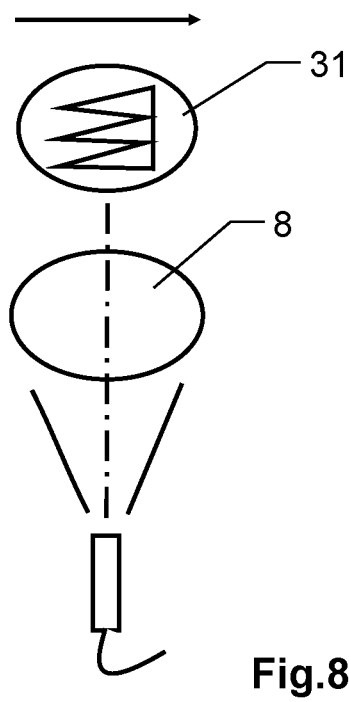
FIG. 8: shows a schematic illustration of a section of a reference light path with a transmissive attenuation element in the form of a filter with a wedge graduation.
Figure 9:
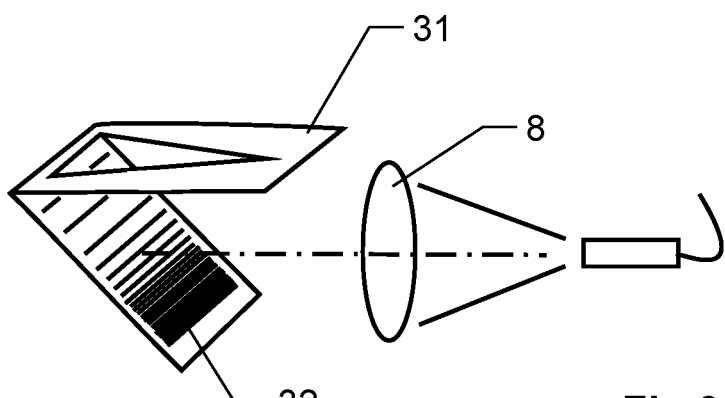
FIG. 9: shows a schematic illustration of a section of a reference light path with an attenuation device with a reflective and a transmissive attenuation element.

FIGS. 8 and 9 show attenuation elements without diffuser plates. According to FIG. 8, the laser measurement radiation reaches through a collimated optical unit 8 and a mask 31 with passage openings acting as a filter. The width of the passage openings increases in a direction indicated by the arrow, with the intensity of the passing laser measurement radiation also increasing in this direction. According to FIG. 9, the laser measurement radiation reaches through a collimated optical unit 8, over a mirror 32 with different reflectivities and through a mask 31 acting as an aperture. The reflectivity and the width of the passage openings change in one direction in such a way that the intensity of the laser measurement radiation increases in the direction indicated by the arrow.

It is understood that these illustrated figures only schematically illustrate possible exemplary embodiments.

The various approaches can likewise be combined with one another and with methods from the prior art.

What is claimed is:

1. A measuring appliance for performing distance measurements to an object, the measuring appliance comprising:
    a distance measuring module comprising an optical transmitter channel and an optical reception channel, with a reference light path and an evaluation device, wherein the optical transmitter channel comprises a transmitter unit for transmitting laser measurement radiation and an optical outlet element, wherein the optical reception channel includes an optical inlet element and a reception unit for receiving laser measurement radiation,
    wherein the measuring appliance renders a measurement light path to the object and back again producible outside of the distance measuring module between the optical outlet element and the optical inlet element,
    wherein the reference light path has a predetermined reference distance, and comprises an attenuation device with an attenuation variable in space or time and is configured in such a way that it renders laser measurement radiation produced by the transmitter unit guidable to the reception unit via the attenuation device,
    wherein the evaluation device is configured to derive a distance to the object using laser measurement radiation returning from the object, received by the reception unit, and laser measurement radiation guided over the reference light path, received by the reception unit, wherein intensity-dependent systematic errors when deriving the distance to the object are compensated,
    wherein in that the reference light path is laid out in such a way that it receives a portion of the laser measurement radiation of the transmitter unit prior to the passage through the optical outlet element, guides said portion to the attenuation device without contact with the surroundings of the distance measuring module and forwards an attenuated portion downstream of the attenuation device to the reception unit through the optical inlet element.

2. The measuring appliance according to claim 1, wherein a section of the reference light path directly upstream of the optical inlet element lies outside of the distance measuring module and the reference light path is unidirectional.

3. The measuring appliance according to claim 1 wherein the entire reference light path is unidirectional.

4. The measuring appliance according to claim 1, wherein the laser measurement radiation for the reference light path produced by the transmitter unit is guided along a section securely arranged at the measuring appliance in the distance measuring module and reaches a section that moves relative to the optical reception channel outside of the distance measuring module.

5. The measuring appliance according to claim 1, wherein an optical deflection element renders a change attainable between the measurement of the reference distance over the reference light path and a measurement over the measurement light path, wherein the deflection element, depending on phase, connects the reference light path or the measurement light path to the reception unit through the optical inlet element or interrupts said connection.

6. The measuring appliance according to claim 1, wherein the measuring appliance further comprises:
    a first appliance part including a section of the reference light path; and
    a second appliance part including the optical outlet element and the optical inlet element,
    wherein a change between the measurement of the reference distance over a reference light path and a measurement over the measurement light path is attainable by a relative movement between the first appliance part and the second appliance part and the reference light path is assigned to the optical inlet element such that, in the case of a given relative position between the two appliance parts, the reference light path is directed on the optical inlet element such that the laser measurement radiation extends through the optical inlet element to the optical reception unit at the end of the reference light path and that, other relative positions of the first and second appliance part, the measurement light path leads through the optical inlet element to the reception unit.

7. The measuring appliance according to claim 6, wherein the predetermined relative position in which the laser measurement radiation at the end of the reference light path reaches the optical reception unit through the optical inlet element, the measurement light path from the optical outlet element to the optical inlet element is at least partly interrupted such that laser measurement radiation from the reference light path reaches the reception unit without laser measurement radiation from the measurement light path.

8. The measuring appliance according to claim 6, wherein the attenuation of the attenuation device is changeable by means of a relative rotational movement between the appliance parts and, in the process, the signal amplitude on the reference light path changes depending on the relative rotational position.

9. The measuring appliance according to claim 6, wherein the reference distance of the reference light path is constant in the case of a relative rotational movement between the appliance parts.

10. The measuring appliance according to claim 1, wherein the attenuation device is constructed in such a way that the attenuation factor assigned thereto is mechanically or electronically adjustable.

11. The measuring appliance according to claim 10, wherein the adjustability is at least partly attained by virtue of the reference light path and at least a part of the attenuation device being adjustable relative to one another in such a way that the reference light path is guidable with different attenuation factors through regions of the attenuation device.

12. The measuring appliance according to claim 10, wherein the attenuation device comprises at least one transmissive or at least one reflective attenuation region.

13. The measuring appliance according to claim 10, wherein the attenuation device comprises an actuator for adjusting at least one part of the attenuation device.

14. The measuring appliance according to claim 10, wherein the attenuation device comprises at least one electronically adjustable attenuation element.

* * * * *